UNITED STATES PATENT OFFICE.

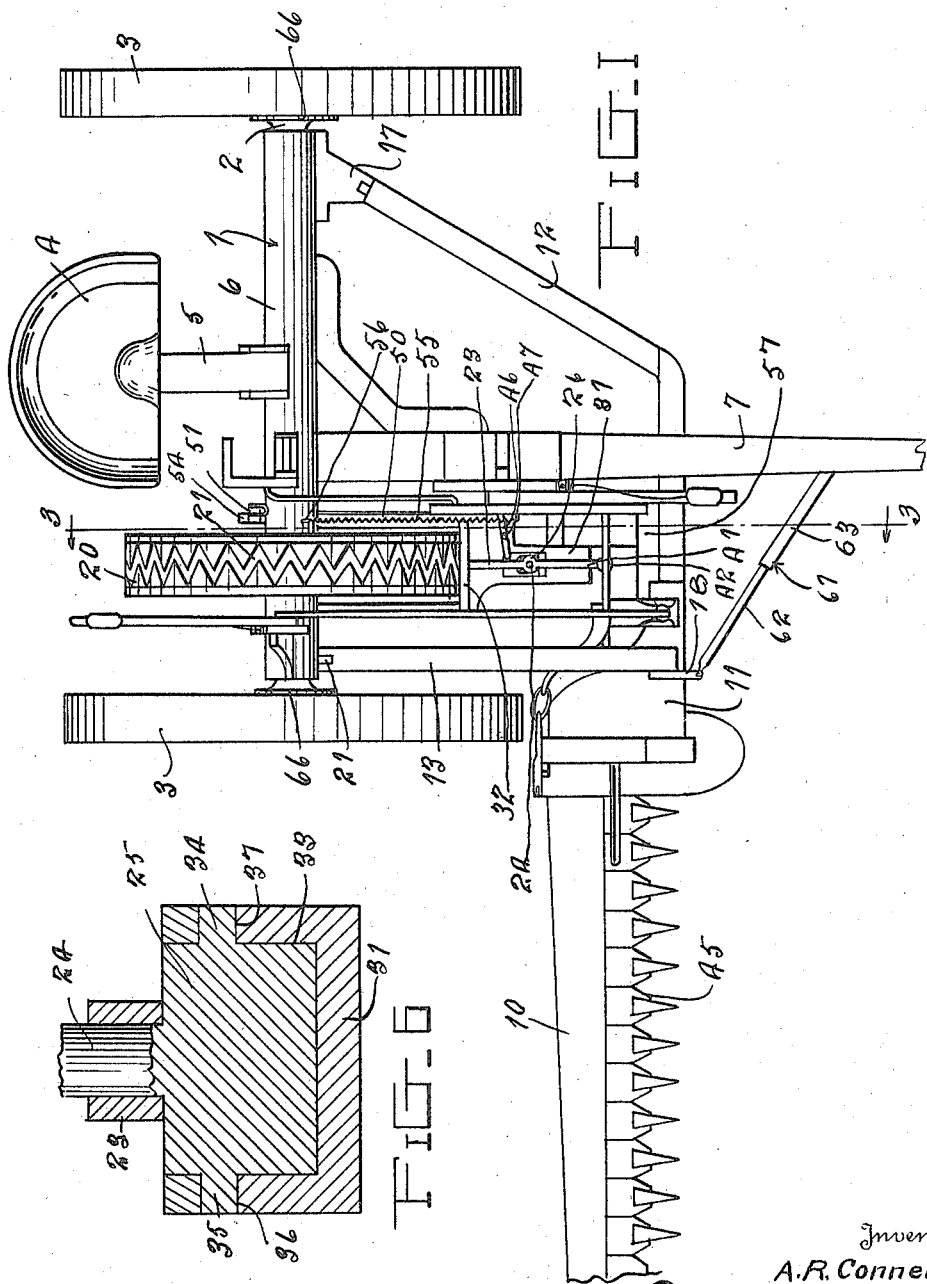

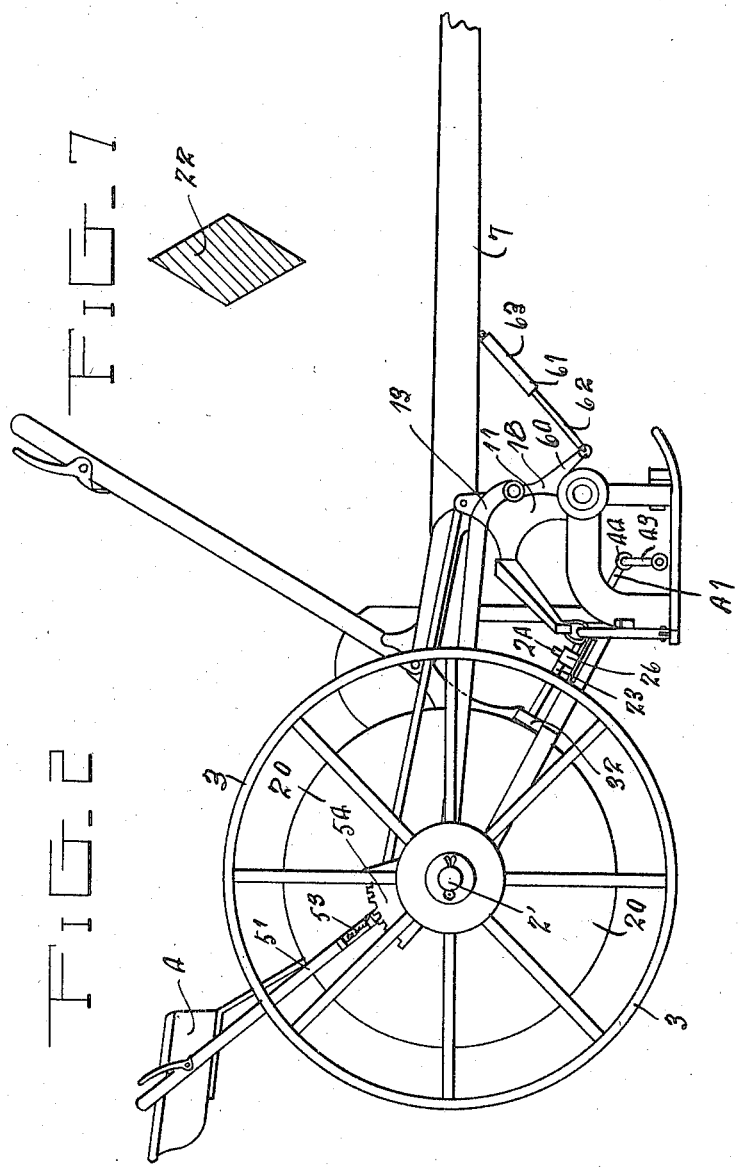

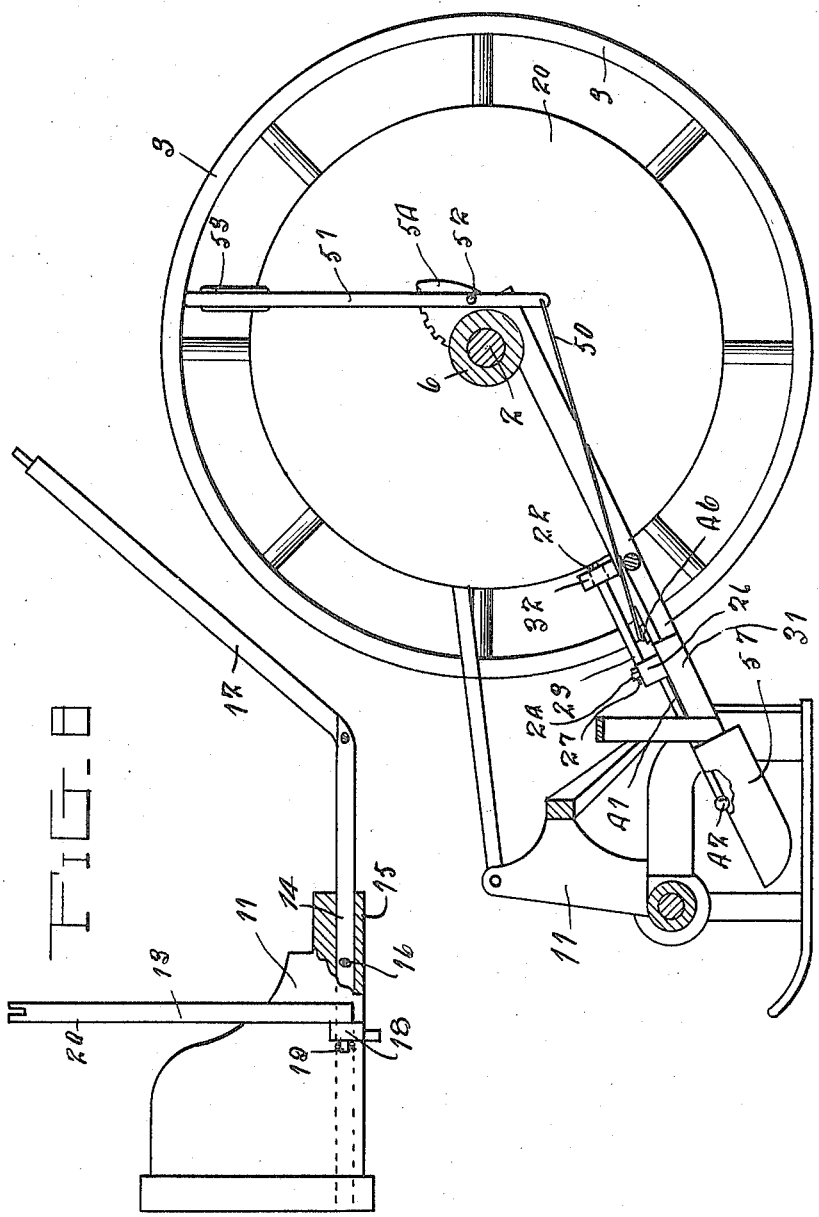

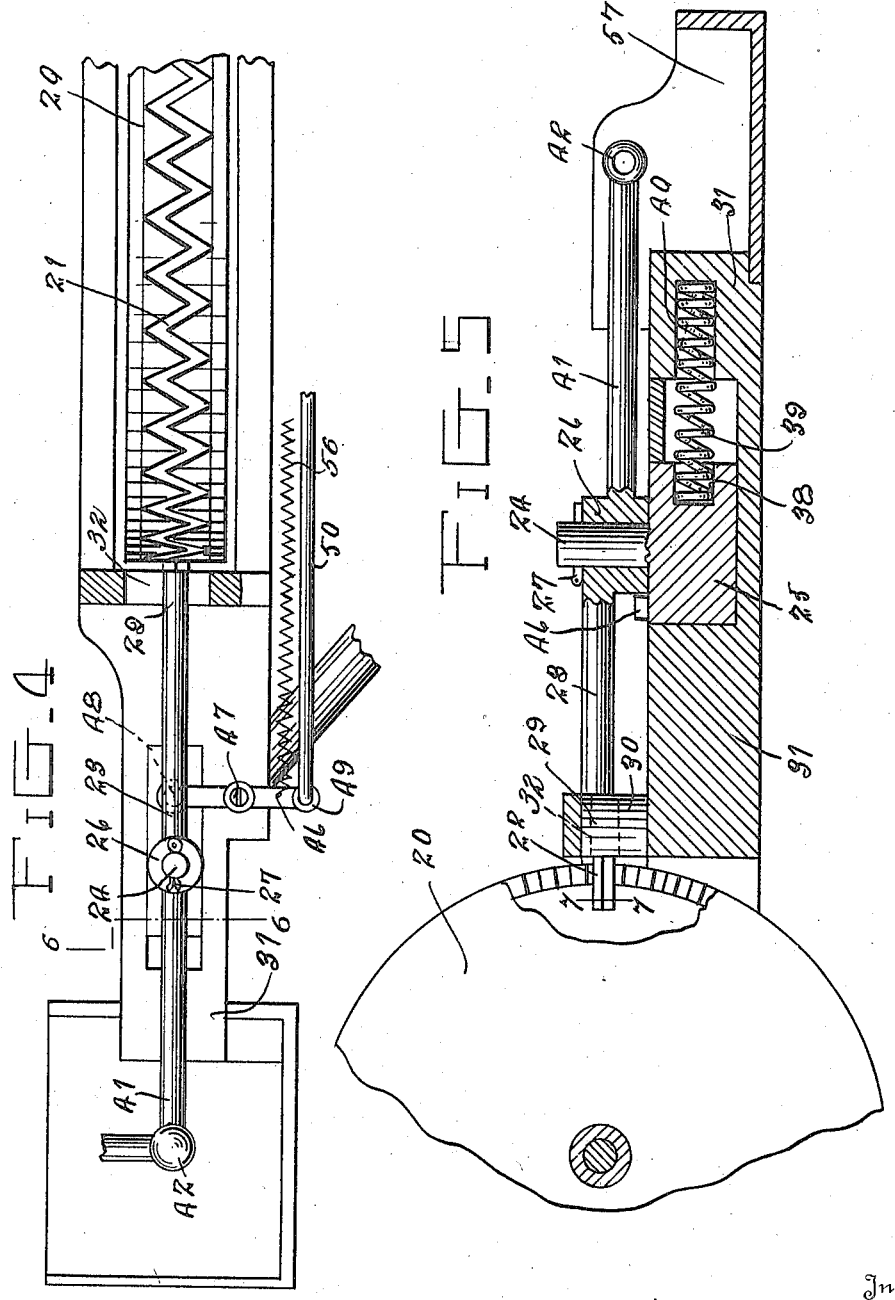

AMBER R. CONNER, OF MEREDITH CENTER, NEW HAMPSHIRE.

MOWER.

1,181,848.  Specification of Letters Patent.  Patented May 2, 1916.

Application filed April 23, 1914. Serial No. 833,953.

*To all whom it may concern:*

Be it known that I, AMBER R. CONNER, a citizen of the United States, residing at Meredith Center, in the county of Belknap and State of New Hampshire, have invented certain new and useful Improvements in Mowers, of which the following is a specification.

This invention relates to harvesters, and more particularly to that type of harvester wherein a reciprocatory cutter bar is employed for cutting the grain or hay.

The primary object of this invention is the provision of a harvesting machine as specified, which embodies a novel form of mechanism for operating the cutter bar, which mechanism will materially decrease the draft of the harvester during the cutting traction of the same, providing for a maximum amount of cutting work with a minimum amount of pulling power, and thereby producing a harvesting machine wherein a cutter bar capable of cutting swaths of increased length with respect to the present cutter bars may be employed without increasing the draft of the harvester.

Another object of this invention is the provision of novel braces formed upon the frame of the harvester for bracing the cutter bar, so as to equally distribute the bracing properties of the braces to the cutter bar, for decreasing or eliminating the weakening of the bar during the cutting operation, and insuring against the breaking of the cutter bar.

A still further object of this invention is the provision of a drum provided with a zig-zag peripheral groove, which drum is operated by the traction of the harvester, and a lever adjustably and slidably mounted within the zig-zag groove, for operating the piston rod and the cutter bar of the harvester in a reciprocatory manner, for efficiently cutting the grain or hay, thereby eliminating the employment of sets of minor gears and materially decreasing the amount of power necessary for the proper propulsion or traction of the harvester.

With the foregoing and other objects in view, this invention consists in such novel features of construction, combination, and arrangement of parts as will be hereinafter more fully described, illustrated in the accompanying drawings, and claimed.

In describing the invention in detail reference will be had to the accompanying drawings, wherein like characters of reference designate like or corresponding parts throughout the several views, and in which:—

Figure 1 is a top plan view of the improved harvester or mowing machine, Fig. 2 is a side elevation, Fig. 3 is a cross sectional view on the line 3—3 of Fig. 1, Fig. 4 is an enlarged fragmentary view of the mechanism for operating a part of the cutter bar, Fig. 5 is a longitudinal section through the mechanism illustrated in Fig. 4, Fig. 6 is a cross sectional view on the line 6—6 of Fig. 4, Fig. 7 is a cross sectional view on the line 7—7 of Fig. 5, and Fig. 8 is a detail plan view of the bracing of the cutter bar.

Referring more particularly to the drawings by numerals, 1 designates the mowing machine as an entirety, which has the ordinary type of supporting axle 2 and the traction wheels 3, which are mounted upon the axle. The axle 2 of the mowing machine has the ordinary construction of seat 4 supported by a resilient bar 5, which bar is attached to the protective casing 6 of the axle in the ordinary manner, and also a tongue 7 attached to the protective casing 6 in the manner which is ordinary in the construction of mowing machines now in use.

The cutter bar 10 of the mowing machine, is supported by the bracket or block 11, which block is securely braced by the braces 12 and 13. The brace 12 has its end 14 reduced in diameter, and it is mounted in an opening 15, which extends entirely through the block or bracket 11, and the end 14 of the brace 12 is held against vertical or rotary movement within the bore 15 by a cotter pin 16, which cotter pin extends transversely through the end 14 and the bearing or bracket block 11, permitting of a certain amount of movement of the shank 14 within the bore 15, owing to the fact that the opening extending through the shank is of slightly increased size with respect to the size of the cotter pin. The brace 12 is angled and is securely attached to a bracket 17, which bracket is supported by the protective casing 6 adjacent one end thereof, as is clearly illustrated in Fig. 1 of the drawings.

The block 11 has formed integral therewith or securely attached thereto, a bearing 18, which bearing projects upwardly vertically from the block 11, and has rotatably seated in its upper terminal end a pin 19, which pin is securely attached to the brace 13, and forms a means for pivotally connecting the brace 13 to the bearing 18 and the block 11. The brace 13 has its end 20, which is opposite to the end upon which the pin 19 is formed, bifurcated, between the arms of which is seated the ear 21, which is formed upon the protective casing 6, and in this manner the brace is securely attached to the frame or protective casing of the mowing machine. The braces 12 and 13 are connected to the body of the machine, for strengthening the cutter bar 10 during the operation of the mower. The cutter bar 10 is connected to the bracing or supporting block 11 so as to be moved into a substantially vertical and non-operative position when desired, and also so that the cutting angle of the bar may be tilted, as is ordinary in the construction of harvesters or mowing machines of this nature, various levers being provided for the control of the tilting and the pivotal movement of the cutter bar.

The axle 2 of the mowing machine has rigidly mounted thereupon, for rotation therewith, a drum 20, which drum is provided with a zig-zag peripheral groove 21, and a hollow portion spaced inwardly of the zig-zag groove, with which hollow portion or recess the groove communicates. The various sections of the zig-zag groove are of equal length, and the alternate lengths are parallel one with the other, as is clearly shown in Fig. 1 of the drawings. The zig-zag slot 21, which extends about the periphery of the drum 20, has seated therein the diamond shaped end 22 of the lever 23. The lever 23 is pivotally mounted intermediate its ends upon a pin 24, which pin is formed upon a block 25 and extends upwardly thereabove, being seated in the bearing 26 which is formed upon the lever 23, and the lever 23 is held against vertical movement upon the pin 24 by a cotter pin 27, which cotter pin is inserted transversely through the pin 24. The lever 23 has its end 29, upon which the diamond shaped portion 22 is formed, enlarged so as to form a depending bearing portion 30, the lower face of which engages the upper surface of the plate 31. The plate 31 is supported by the protective casing 6 in any suitable manner, and it extends downwardly from the casing at an acute angle to the central longitudinal axis of the shank, as is clearly shown in Fig. 3 of the drawings. The end 29 of the lever 23 is guided in its pivotal movement by a guide-way 32, which guide-way is formed upon the plate 31 and positioned adjacent the periphery of the drum 20, as is clearly shown in Fig. 3 of the drawings. The block 25, to which the lever 23 is pivotally connected by the pin 24, is seated in a recess 33, formed longitudinally within the plate 31, and it has wings 34 and 35 formed upon its edges. The wings 34 and 35 extend laterally from the edges of the block and are slidably seated in slots 36 and 37, which slots communicate with the groove 33. The wings 34 and 35 form means for guiding the movement of the block 25 within the recess 33.

The block 25 is provided with a cut out portion or recess 38, extending into the block from one end thereof, which recess has a coil spring 39 seated therein. The coil spring 39 extends out of the recess 38, and is also positioned in a recess 40, which is formed in the plate 31.

The end 41 of the lever 23, which extends oppositely from the bearing 24 of the lever, has a ball 42 formed upon its terminal end, which ball is seated in the socket end of the lever 43, for forming a ball and socket joint 44 between the lever 23 and the lever or pitman rod 43 for actuating the cutting sections 45 of the cutter bar 10. A lever 46 is pivotally connected at 47 to the plate 31, and has its terminal end 48 securely connected to the block 25, while its outer terminal end 49 has connection with a rod 50. The rod 50 extends outwardly along the pate 31, and is connected to the lower end of a lever 51, which lever is pivotally mounted upon a pin 52, and carries a dog mechanism 53, which coacts with a quadrant 54. By the manipulation of the lever 51, the block 25 is moved within the recess 33 for positioning the diamond shaped end 22 of the lever 23 within the zig-zaged slot 21 for operating the pitman rod and the cutting sections of the cutter bar. A coil spring 55 is attached to the lever 46 and to an eyelet 56, which is carried by the protective casing 6 of the axle 2, and it tends to hold the lever 46 in the position as illustrated in Fig. 1 of the drawings, or to permit of the movement of the lever, which would be occasioned by the traveling of the diamond shaped end 22 in the zig-zag slot 21, so as to retain the lever 46 always in a proper position for operation by the hand lever 51.

The plate 31 has a shoe 57 formed upon its lower end, which shoe is hollow and provides for the reception and protection of the ball and socket or universal joint 44, which is formed by the connection between the end 41 of the lever 23 and the pitman rod 43.

The bearing 18 has an arm 60 formed thereupon, which arm extends downwardly from the bearing and outwardly from the block 11, and has a telescoping brace 61 attached thereto, which brace is in turn attached to the tongue 7 of the mowing machine. A telescoping brace 61 is formed of two sections 62 and 63, one section of which is telescopically mounted in the other, so as to further brace the cutter bar construction of the mowing machine and also to provide for the adjustment of the bracing bar 61 to the movement of the tongue and the movement of the parts contingent with the cutter bar upon the various adustments of the latter.

The traction wheels 3 of the mowing machine are mounted upon the axle 2 in the ordinary manner, and are held against independent rotation upon the axle 2, when the mower is moving in its forward position, by pawl and ratchet mechanisms 66, which are carried by the axle 2 and the wheels 3.

In the operation of the improved mower; when the cutter bar 10 is lowered for cutting the hay or grain, and it has been tilted to the proper elevation, the lever 51 is actuated for moving the diamond shaped end 22 of the lever 23 into the zig-zag groove 21, which extends peripherally about the drum 20. With the forward travel or traction of the mowing machine, the drum 20 will be rotated, owing to the fact that it is rigidly mounted upon the axle 2, and the rotation of the drum will impart a vibratory movement to the lever 23 and to the pitman rod 43 of the machine, by the traveling of the diamond end within the zig-zag groove, thereby imparting a reciprocatory movement to the cutting sections 45 of the cutter bar 10, for efficiently cutting the grain or hay. By the position of the zig-zag groove 21, and the lever 23, which operates the cutting sections 45 of the cutter bar 10, the amount of power which is necessary for the propulsion of the mower will be materially decreased, owing to the fact that the lost motion occasioned by the direct transmission of the vibratory movement of the lever 23 to the cutting section will be much less than in cases where the ordinary type of construction of bevelled mitered gears is employed for transmitting the reciprocatory movement to the cutting sections of the cutter bar.

From the foregoing description, taken in connection with the accompanying drawings, the advantages of the construction and of the method of operation of the improved mower will be readily apparent to all those skilled in the art to which this invention appertains and, while in the foregoing description, the principle of the operation of this invention has been described, together with various features of construction, it is to be understood that certain minor features of construction, combination and arrangement of parts may be altered to suit practical conditions, provided such alterations are comprehended within the scope of what is claimed.

What is claimed is:—

1. In a mowing machine structure, the combination, of a supporting frame, an axle carried by said supporting frame, a drum mounted upon said axle and provided with a peripheral zig-zag slot, a reciprocatory cutter bar, a pitman rod connected to said cutter bar, a plate carried by said supporting frame, said plate being provided with a facial recess and having slots formed therein and communicating with said recess, a block slidably mounted in said recess, wings formed upon said block and seated in said slots, a spiral spring carried by said plate and engaging said block, a lever pivotally carried by said block and having one end seated in said zig-zag slot, and its other end connected to said pitman rod for reciprocating said cutter bar upon rotation of said drum.

2. In a mowing machine structure, the combination, of a supporting frame, an axle carried by said supporting frame, a drum mounted upon said axle and provided with a peripheral zig-zag slot, a reciprocatory cutter bar, a pitman rod connected to said cutter bar, a plate carried by said supporting frame, said plate being provided with a facial recess and having slots formed therein and communicating with said recess, a block slidably mounted in said recess, wings formed upon said block and seated in said slots, a spiral spring carried by said plate and engaging said block, a lever pivotally carried by said block and having one end seated in said zig-zag slot and its other end connected to said pitman rod for reciprocating said cutter bar upon rotation of said drum, a lever pivotally carried by said plate and having one end connected to said block, a rod connected to said lever, and a hand lever operatively connected to said rod for moving said block within said recess for moving the end of said first named lever into or out of said zig-zag slot.

In testimony whereof I affix my signature in presence of two witnesses.

AMBER R. CONNER.

Witnesses:
W. C. DAVIS,
A. R. DERMODY.

Copies of this patent may be obtained for five cents each, by addressing the "Commissioner of Patents, Washington, D. C."